Dec. 23, 1941.  W. E. SELF ET AL  2,267,623
PROCESS FOR PRODUCING BLOWPIPE NOZZLES, AND PRODUCT THEREOF
Filed Feb. 29, 1940  3 Sheets-Sheet 1

INVENTORS
LIVINGSTON T. DICKASON
WILLIAM E. SELF
BY
ATTORNEY

Dec. 23, 1941.   W. E. SELF ET AL   2,267,623
PROCESS FOR PRODUCING BLOWPIPE NOZZLES, AND PRODUCT THEREOF
Filed Feb. 29, 1940    3 Sheets-Sheet 2
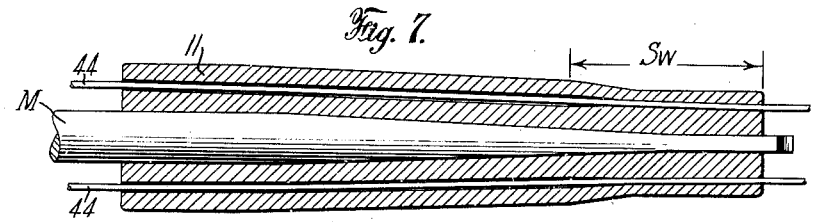
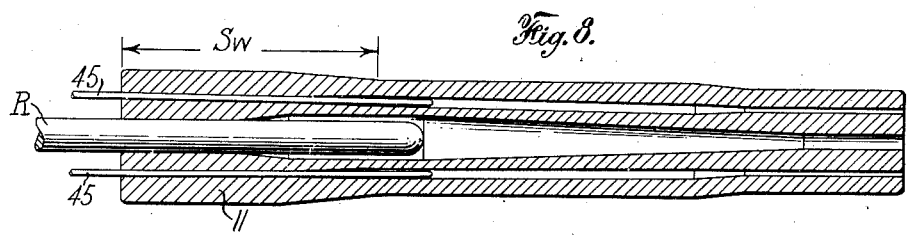
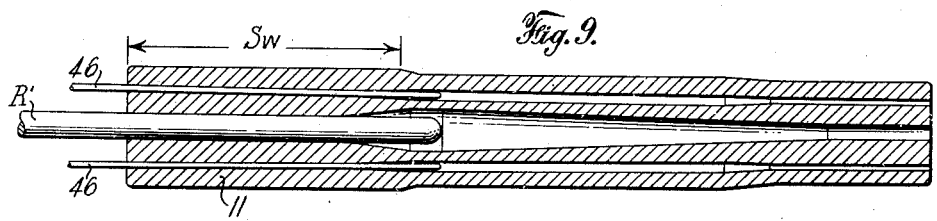
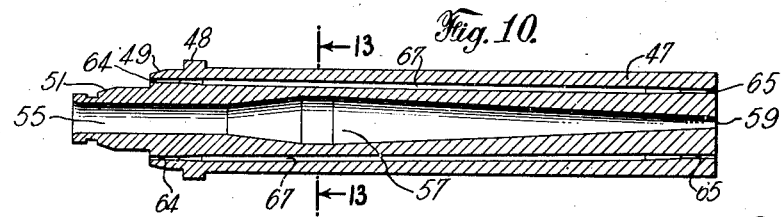
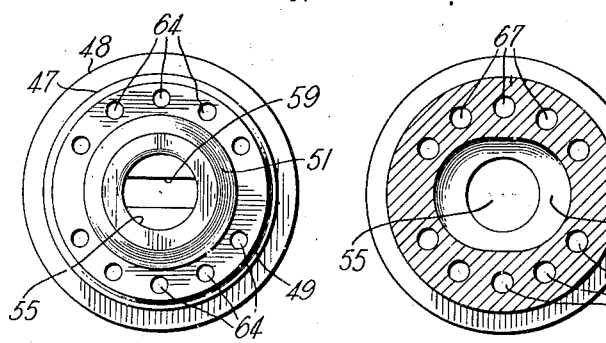
INVENTORS
LIVINGSTON T. DICKASON
WILLIAM E. SELF
BY
*E L Greenewald*
ATTORNEY Dec. 23, 1941. W. E. SELF ET AL 2,267,623
PROCESS FOR PRODUCING BLOWPIPE NOZZLES, AND PRODUCT THEREOF
Filed Feb. 29, 1940 3 Sheets-Sheet 3
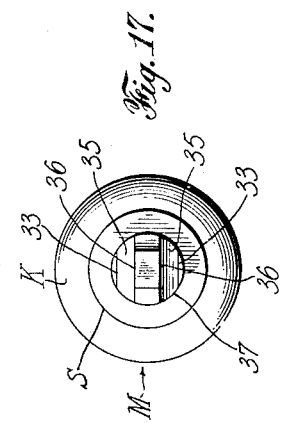
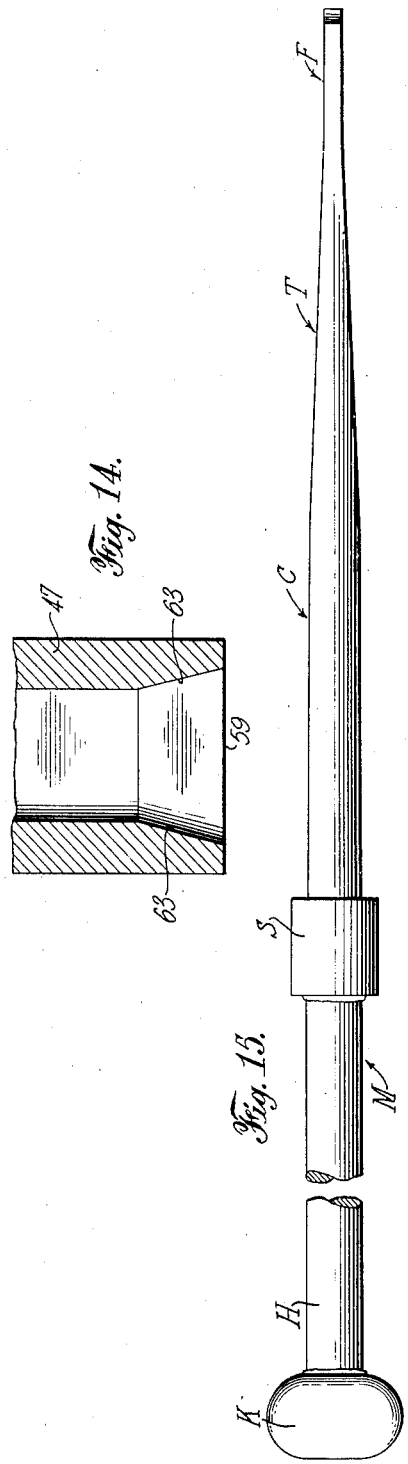
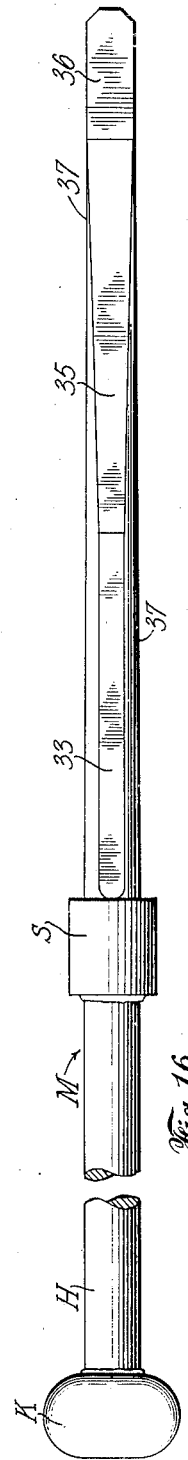
INVENTORS
LIVINGSTON T. DICKASON
WILLIAM E. SELF
BY
*E. Greenewald*
ATTORNEY Patented Dec. 23, 1941

2,267,623

UNITED STATES PATENT OFFICE 2,267,623

PROCESS FOR PRODUCING BLOWPIPE NOZZLES AND PRODUCT THEREOF

William E. Self, South Orange, and Livingston T. Dickason, Short Hills, N. J., assignors to The Linde Air Products Company, a corporation of Ohio Application February 29, 1940, Serial No. 321,434

27 Claims. (Cl. 29—157)

This invention relates to one-piece blowpipe nozzles having at least one longitudinal tapered passage with a slotted or other non-circular discharge orifice; and to a method for their production. More especially it concerns a unitary nozzle having such a passage with an inlet portion in communication with the said discharge orifice through a tapered intermediate portion or chamber of greater cross-sectional area than that of either the inlet or the discharge orifice. The invention has especial utility in the production of nozzles adapted for oxy-fuel gas cutting and flame-machining operations.

Flame-machining and cutting nozzles having slotted or elongated discharge orifices of non-circular cross-section have many advantages. Thus, cutting nozzles having the usual circular discharge orifices for the oxygen make concave cuts in the metal surface when used in standard deseaming operations. When a cutting head carrying a number of such nozzles is used to scarf a wide area of metal at each pass, the scarfed area has a wavy appearance because of ridge formation between the paths of the flames from adjacent nozzles. Slotted nozzles may have wide flat discharge orifices. The cut of each nozzle is flat or nearly so. When using a plurality of these nozzles, a slight overlapping of adjacent oxygen streams eliminates or reduces ridge formation and facilitates the elimination of surface defects in a billet or the like being desurfaced.

Many difficulties arise in making this type of nozzle from one piece of metal by conventional methods of machining. Such procedures are very costly, because of the irregular shape of the gas passage,—involving a series of drilling, boring, milling, shaping or planing operations. Indeed, if the irregular or non-circular passage could be machined at all, this could only be accomplished by an expert machinist and in a slow and laborious manner.

Among the more important objects of the present invention are: to produce a novel one-piece blowpipe nozzle having a discharge orifice non-circular in cross-section; to provide a one-piece nozzle with a passage having a slotted discharge orifice in communication with a long tapered chamber non-circular in cross-section, and having a cross-sectional area greater than that of the inlet to the chamber and that of said discharge orifice; to provide a novel method by which such a nozzle can be readily and quickly made by comparatively unskilled labor; and to provide in novel manner for the application of a swaging technique to the production of such a nozzle. These and other objects will be apparent from the following description of the invention.

Procedures are well known for making blowpipe nozzles by swaging blanks of copper bar stock provided with longitudinally-drilled rough oversize passages in which mandrels in the form of music wire are inserted. One such method is disclosed in United States Patent No. 1,644,157 of Elmer H. Smith. By virtue of the swaging operation, the length of the blank is increased, and its cross-sectional area, as well as that of the oversize passages, are reduced, the latter passages conforming to the size and shape of the round wire mandrels. By such procedure, the outer surface of the blank is maintained cylindrical throughout each swaging operation.

However, surprisingly, such prior methods cannot be used to produce blowpipe nozzles having a tapered passage therethrough, provided with a discharge orifice non-circular in cross-section, which is sufficiently accurate in size and shape for industrial use. It now has been discovered that, invariably, when a tapered mandrel having a working surface which is flattened or non-circular in cross-section is inserted within a longitudinal passage in a metal blank and the outer surface of the latter then is swaged in the usual manner into an elongated cylindrical shape, the swaged metal does not follow the tapered and flattened surface of the mandrel and close in snugly around the leading end of the working surface thereof. One apparent explanation for this phenomenon is as follows: As the blank and tapered mandrel assembly being swaged enters the tapered mouth of the usual swaging dies, the swaging action causes the metal to flow around the mandrel and into intimate contact therewith.

When the part of the blank being worked reaches the blade or cylindrical part of the dies, the flow of the metal toward the adjacent mandrel surface ceases at that part of the blank within the cylindrical die blade, since no swaging occurs there. However, under the action of the swaging dies, the metal of that part of the blank still in the tapered or working part of the die still is being hammered and continues to flow directly forward. This flow of the metal from the middle or lagging part of the blank toward the leading end, where no swaging action is occurring, causes the metal at the leading end of the blank to leave the tapered leading end of the mandrel As the blank is advanced through the dies, the leading end of the blank tends to leave the mandrel more and more, and the outlet orifice in the swaged blank is not the required shape or size.

In accordance with a preferred form of the present invention, a blank of ductile metal, preferably cut from copper bar stock, and having a longitudinal oversize passage therethrough, is subjected to a succession of swaging operations, utilizing tapered dies, while said passage contains an oiled mandrel of non-ductile metal, the working surface of which is generally wedge-shaped or has a gently tapered portion gradually merging into a flattened end portion having a size and shape corresponding to the desired size and shape of the discharge orifice to be formed in the metal blank, and is adapted smoothly to shape the walls of the passage leading to the orifice. Preferably, swaging dies are employed which have an extremely long taper,—for example, a uniform taper of around 0.04 inch to 0.10 inch or more per inch of length of dies surface,—and one preferably closely approximating or somewhat greater than the degree of taper on the adjacent working surface of the mandrel. Only tapered surfaces of the swaging dies work the metal. Since such tapered portions surround the tapered and flattened portion of the mandrel, the metal moving along the working surface of the tapered mandrel continuously is being swaged into contact with the forwardly and inwardly flattened sloping surface of the mandrel by the tapered dies. During these swaging steps, a substantial portion or all of that zone of the outer surface of the blank that is actually being swaged is maintained frusto-conical by the action of the tapered dies. This facilitates the production of a blank having an accurate tapered passage and a non-circular discharge orifice of the exact shape and size desired. Between successive swaging operations, where desired or necessary, the mandrel or mandrels are removed, and the partially-shaped blank is annealed, pickled, bright-dipped and cleaned, as hereinafter described.

In instances where the nozzle is provided with preheating gas passages, the outlets of which must bear a certain locational relation to the non-circular discharge orifice of a tapered cutting gas passage, the metal blank first may have formed therein a cutting gas passage. The discharge end of the blank then is deformed by swaging over a flat-sided tapered oiled mandrel to provide a flat-sided discharge orifice. The preheating gas passages then are drilled in the blank in a selected locational arrangement relative to said discharge orifice. The blank thus is prevented from turning on the flattened tapered mandrel during subsequent swaging operations; and therefore the selected relationship of the preheating gas passage outlets to the non-circular discharge orifice is maintained.

It is convenient to utilize swaging dies and a tapered flattened mandrel, the respective tapered working surfaces of which are at least as long as the finished blowpipe nozzle. However, standard swaging machines generally are provided with dies around three inches or less in length. Since generally the finished nozzles are longer than this, it becomes necessary when using standard length dies to swage only portions of the blank in certain operations. When using dies of standard length, with non-tapered mandrels in the preheating gas passages, and a tapered mandrel in a central passage, the blank-mandrel assembly may be passed completely through the dies during the first swaging steps. This type of conventional swaging operation, if employed, is discontinued when inspection of the discharge end of the nozzle blank shows a slight separation of the metal of the blank from the adjacent surface of the tapered mandrel.

Thereafter the blank, with the tapered mandrel in the central passage, and untapered mandrels in the oversize preheating gas passages, are subjected to a series of swaging operations wherein only tapered surfaces of the dies cooperate with the opposing portions of the tapered flattened mandrel to force the swaged metal along the tapered surface of the mandrel and maintain it closely adjacent thereto. This is facilitated, in each swaging step, by discontinuing the swaging before that portion of the blank surrounding the tapered surface of the mandrel has passed the small diameter end of the tapered die surfaces. After the blank has reached a selected length, as a result of these swaging steps, one or more swaging operations are applied to the leading end thereof alone, utilizing the tapered surface of the central mandrel, to provide the nozzle blank with a discharge outlet of preselected shape and size. Concurrently the last-named swaging step or steps reduces the diameter of the outlet end of each preheating gas passage to a preselected size.

The tapered mandrel then is withdrawn and a short cylindrical mandrel is substituted therefor. The latter extends within the inlet end of the nozzle blank and as far as the tapered portion of the central passage. Mandrels also are inserted into the respective preheating gas passages in usual manner. The portion of the blank-mandrel assembly between the inlet end and the tapered portion of the central passage then is swaged in one or more swaging operations, using successively smaller mandrels in the respective passages, thereby reducing the inlet ends of these passages to the desired sizes.

Following the last swaging and annealing operations, the nozzle blank is cut to length, and subjected to the usual machining and finishing operations.

During the swaging operations there is a twist or lateral drift of the swaged metal in the direction of rotation of the spindle head of the usual type of swaging machine carrying rotary hammers. While such lateral drift of the metal does not prevent the production of satisfactory swaged nozzles having a central passage with a circular discharge orifice,—it interposes a very serious problem in connection with the manufacture of swaged nozzles having a slotted or otherwise non-circular discharge orifice, in conjunction with spaced preheating gas orifices, each of which must be accurately located with respect to the non-circular orifice, to adapt the nozzles for effective use in flame-cutting and machining operations. The amount of this lateral drift of the metal during swaging varies with such factors as the distance of the swaged metal from the axis of the blank and with the length of the blank. Applicants have discovered that it is possible effectively to compensate for this lateral drift by so locating the outlet ends of the preheating gas passages in the unswaged blank with respect to the non-circular oxygen discharge orifice that, upon completion of the swaging operations, the normal lateral drift of the metal of the blank will have shifted the preheating gas outlets to the desired position relative to the non-circular oxygen orifice. Simple trial establishes the extent of this lateral drift for any given metal, size of blank, location of the passages, and shape and size of the dies. Thus in one instance where a copper blank 1.6 inches long and 1.6 inches in diameter, having a central passage about 0.5 inch in diameter, was converted to a deseaming nozzle blank 6.3 inches long, having a narrow slotted central passage orifice 0.56 inch in length and .013 inch in width,—the preheating gas passages were arranged in two groups of five, each preheating gas passage outlet being equi-distant from the longitudinal axis of the blank and centered 0.5 inch from the said axis,— the said groups of passages were so drilled that a clockwise metal drift of 21° during swaging brought the outlets of the two groups of passages in symmetry relative to the longitudinal axis of the slotted orifice of the central passage.

The objectionable lateral twist of the metal during swaging also effectively may be offset or counteracted and its disadvantages overcome by periodically reversing the direction of rotation of the swaging machine spindle head that carries the hammers which strike the swaging dies,— whereby metal flow in one direction during one swaging step is neutralized by metal flow in the opposite direction in a subsequent swaging step.

In the accompanying drawings, illustrating one preferred form of the invention adapted for the production of flame-cutting and machining nozzles, Fig. 1 is a longitudinal section through a metal blank having a central passage formed therein;

Figure 1:
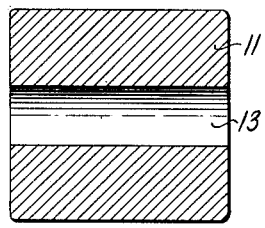

Figs. 4 to 7, respectively, are longitudinal sections through certain assemblies of blank, tapered mandrel, and preheating gas passage mandrels, at successive stage of the process, immediately following certain swaging operations, applied to the zone Sw of the blank;

Figs. 8 and 9, respectively, are longitudinal sections through certain assemblies of blank and cylindrical stub mandrels, at successive, later stages of the process, immediately following swaging operations applied to the zone Sw of the blank;

Fig. 10 is a longitudinal section through a finished nozzle, following machining operations;

Figs. 11 and 12, respectively, are views of the inlet end and the discharge end of the finished nozzle;

Fig. 13 is a section taken along the lines 13—13 of Fig. 10, looking in the direction of the arrows;

Fig. 14 is a fragmentary section taken along the lines 14—14 of Fig. 12; and

Figs. 15 to 17, respectively, are a side view, a top view and an end view of one form of tapered mandrel.

Referring to the drawings, numeral 11 designates a metal blank cut from copper bar stock and having a rough oversize axial passage 13 therethrough, preferably formed by drilling. In preparation for use in the process, the blank preferably is washed to remove grease and oil, dried, and is then annealed at a temperature around 900° F., or to a degree that insures against failure of the blank or gripping of the mandrel during the first swaging step or steps. The blank is then pickled in a solution of commercial sulfuric acid; is bright dipped in a solution of nitric acid; and is finally washed in hot water and dried.

Figure 3:
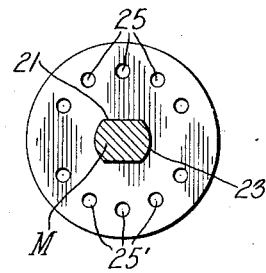
Fig. 3 is a section taken along lines 3—3 of Fig. 2, looking in the direction of the arrows.

A mandrel M (see Figs. 15 to 17) having two opposing slightly tapered and flattened generally cylindrical working surfaces C and a tapered portion T, flattened and non-circular in cross-section, is then positioned within the passage 13, and the blank is swaged throughout its length, thereby tapering the portion of the passage 13 adjacent the discharge end, and providing a non-circular discharge orifice 21, as shown in Fig. 3. Thus the blank is prevented from turning on the mandrel M during succeeding swaging operations.

Figure 2:
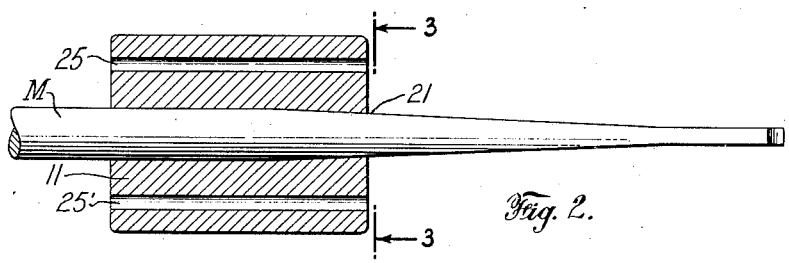
Fig. 2 is a longitudinal section through the blank after a swaging operation with the central tapered mandrel in place, and after a plurality of preheating gas passages have been drilled therein.
Figure 4:
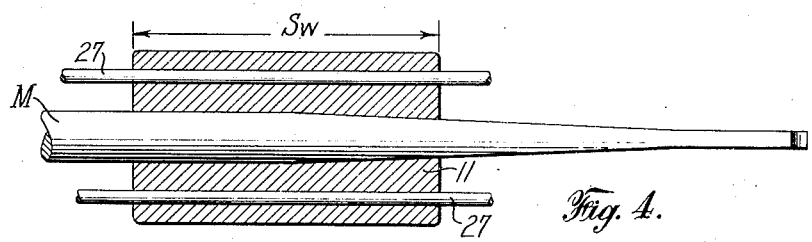
Figure 5:
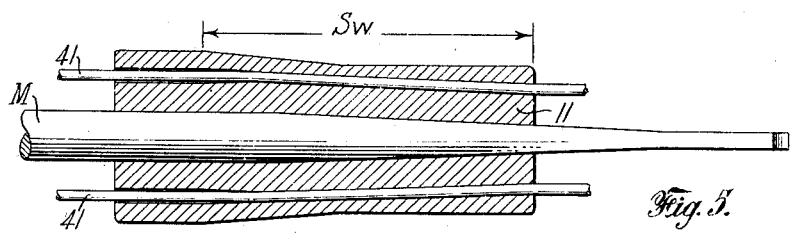
Figure 6:
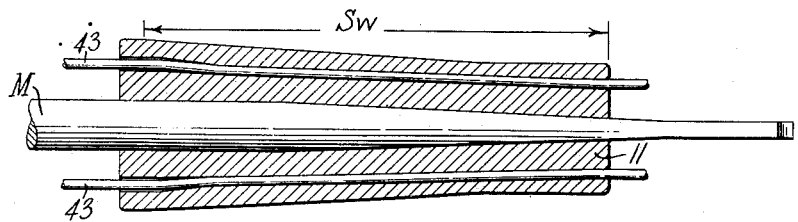

The blank 11 illustrated in Figs. 2 et seq. is provided with a plurality of spaced longitudinal oversize preheating gas passages 25, 25'. These passages preferably are drilled simultaneously from opposite ends of the blank by pairs of aligned drills.

For the purpose of insuring the accurate location in the finished nozzle of the preheating gas passage outlets, in spaced groups arranged symmetrically of the central slotted or non-circular orifice, in spite of lateral drift of the metal during the swaging operations, the passages 25, 25' may be so drilled that the axis of symmetry of the respective groups of passages 25 and 25' lies on that side of the major axis of the orifice 21 (Fig. 3) opposite the direction of drift of the swaged metal, and forms with said major axis an angle substantially equal to the angle of lateral drift of the metal at the preheating gas outlets produced by the series of swaging operations. Thus during swaging, lateral flow of the metal shifts the said passage outlets so as to make these axes coincide (see Fig. 12).

This same result may be secured somewhat more advantageously by drilling the outlets of passages 25, 25', in their desired final location, and reversing the direction of rotation of the swaging hammers during certain succeeding swaging operations to maintain this relationship in the completed nozzle.

The blank 11 containing passages 13, 25 and 25', is then annealed, bright dipped, cleaned and dried. It is then mounted upon the first mandrel assembly comprising the tapered mandrel M and the mandrels 27. In the form shown in Figs. 15 to 17, the mandrel M has a flat, slightly tapered forward end F having the desired size and cross-sectional shape of the outlet of central passage 13 of the finished nozzle; the aforesaid tapered and flattened portion T, and the slightly flattened generally cylindrical portion C. The mandrel also has a handle H, a brazed collar or stop member S, and a knob K. The working surfaces C, T and F of mandrel M respectively include the two opposite flat merging surface zones 33, 35, 36, gently tapered forwardly and inwardly; and the two opposite curved surfaces 37, which are tapered slightly forwardly and inwardly. The mandrels are oiled before introduction into the passages in the blank.

The blank-mandrel assembly, after dusting the blank with powdered mica, is fed into a standard rotary swaging machine, the die surfaces of which preferably are tapered for their entire length and which have a long taper, such as one of around 11° or less. The taper desirably corresponds approximately with the taper on the working surfaces 35 of the mandrel M. The assembly is swaged between the dies, with the gas outlet end of the nozzle blank leading, thus elongating the blank, reducing its diameter, and making the oversize passages approach the diameters of the adjacent parts of the mandrels.

The amount of swaging used in each swaging step is dependent upon the hardness imparted to the metal by such cold working. The permissible degree of area reduction in each swaging step before annealing readily can be determined by trial for each batch of copper, desired size of blank, number and size of passages, and construction of the finished nozzle.

After the first swaging step, the blank may be removed from the mandrel assembly, annealed, pickled, bright dipped, washed and dried, after which it is mounted upon a second mandrel assembly comprising the aforesaid tapered mandrel M and smaller mandrels or wires 41, and this assembly swaged to produce a further reduction in diameter of the passages 25, 25' and of the tapered part of the oxygen passage.

The procedure of inserting mandrels, swaging the assembly, and extracting mandrels, is now repeated, using successively smaller mandrels 43 and 44 in passages 25 (see Figs. 6 and 7), and using mandrel M. Generally it is preferred to anneal and bright dip the blank after each swaging step.

In the first one or two swaging steps the blank may, if desired, be passed entirely through the swaging dies. In later swaging steps using tapered mandrel M, the tapered die surfaces act upon selected portions of the blank essentially including portions overlying the tapered portion of the mandrel M. One or more swaging operations are directed upon the leading end of a blank-mandrel assembly (see Fig. 7) whereby the outlet orifices of the nozzle are brought to the desired final shape and size. Either prior or subsequent to the last-named step, the intermediate portions of the blank may be swaged to lengthen the blank and provide the oxygen passage with smooth tapered walls.

Mandrel M and mandrels 44 are then withdrawn and replaced by a short cylindrical mandrel R of smaller diameter, and short stub mandrels 45, said mandrels R and 45 extending only from the gas inlet end of the blank to a point adjacent the tapered portion of the passage 13. With mandrel R, and mandrels 45 assembled in the blank, the assembly is swaged at the gas inlet end of the blank, in the zone Sw (Fig. 8). This figure shows the arrangement of parts immediately after this swaging operation. Fig. 9 is a view similar to Fig. 8, showing the arrangement of parts following a subsequent swaging operation applied along the zone Sw indicated in that figure using a short mandrel R' and stub mandrels 46,—respectively similar to but smaller than mandrels R and 45. These operations reduce the diameter of the passages 25, 25' adjacent the inlet ends thereof. Thus the inlet and outlet ends of each passage 25, 25' are smaller in diameter than the intermediate portion thereof, as clearly shown in Figs. 9 and 10.

Figs. 10 to 14 illustrate the swaged nozzle following the usual finishing operations employed to shorten it and give it the desired shape and size. This nozzle has a cylindrical outer surface 47, an annular shoulder 48, a rearwardly tapered portion 49, and a forwardly extending end portion 51 of well-known conformation, the parts 48, 49 and 51 being designed to cooperate with a blowpipe head in the usual manner. The nozzle has a central passage for cutting oxygen, with a cylindrical inlet portion 55, and an enlarged mid-portion 57 having opposite side walls tapering forwardly and inwardly to define a slotted, non-circular passage outlet 59. The opposite end margins of the outlet 59 are rounded, as shown at 61 in Fig. 12; and the walls forming the same are tapered inwardly, as shown at 63 in Fig. 14,—by a broaching procedure. A plurality of spaced gas passages 25, 25' extend through the nozzle and are arranged in groups, with their outlets symmetrically disposed relative to the longitudinal axis of the outlet 59. The inlet 64 and outlet 65 of each passage 25, 25' are respectively smaller in diameter than the intermediate portion 67 thereof (see Figs. 11 to 13).

In one adaptation of the invention, copper blanks 1.63 inches in diameter and about 1.63 inches in length, having a central passage about 0.5 inch in diameter, have been converted into unitary nozzles 6.3 inches long, and 0.77 inch in diameter. Such a nozzle has a central passage having an inlet end 0.27 inch in diameter, and a slotted discharge orifice (as shown in Fig. 12) which is 0.125 inch in width and 0.5 inch in length. Two groups of preheating gas passages 25, 25' are symmetrically arranged, as shown in Figs. 11 to 13, in groups of 5 passages,—the inlet and outlet of each passage 25, 25' having, respectively, diameters of 0.067 inch and 0.052 inch.

While for purposes of illustration the features of the invention have been described in connection with one specific embodiment of the invention, it will be understood that various changes may be made in the process and article described without departing from the principle of the invention, and that certain features may be used without others. By employing mandrels having tapered working surfaces of suitable conformation, nozzles may be produced having gas passages with outlet orifices that are oval, ellipsoidal, lenticular, or otherwise non-circular or irregular in cross-section. Thus the blowpipe nozzle may be produced by other pressure-forming operations in addition to the preferred procedure herein specifically described. For example, the pressure-forming method and apparatus described in the United States Patent No. 2,217,194 of Chalmers K. Bryce and Peter R. Aronson may be utilized, in conjunction with at least one tapered mandrel similar to the mandrel M. After annealing the nozzle blank thus produced, it is mounted upon a plurality of short tapered mandrels which extend from the inlet ends of the passages in the nozzle to the mid-portions thereof, as shown in Fig. 8. The nozzle blank and mandrel and punch assembly is placed under the ram of a power press and is forced downward into a tapered die that is open at both ends and has a tapered working surface adapted to cooperate with only that portion of the gas inlet end of the nozzle blank housing the short mandrels. This procedure results in the reduction of the cross-sectional areas of the inlet ends of the passages within the nozzle, and the production of a nozzle having the general structure hereinbefore described.

The invention is susceptible of modification within the scope of the appended claims.

We claim:

1. A unitary blowpipe nozzle formed from a single piece of ductile metal by a pressure-forming operation, which comprises an elongated nozzle body, a longitudinal passage extending through said body and having an outlet of non-circular cross-section, said passage having an inlet and an outlet respectively of smaller cross-sectional area than the intermediate portion of said passage.

2. A unitary blowpipe nozzle formed from a single piece of ductile metal by a pressure-forming operation, which comprises an elongated nozzle body, a longitudinal passage extending through said body, said passage having an inlet, an intermediate portion provided with tapered side walls, and a restricted outlet orifice non-circular in cross-section, said outlet orifice having a smaller cross-sectional area than said intermediate portion.

3. A unitary blowpipe nozzle, formed from a single piece of ductile metal by a pressure-forming procedure, which comprises an elongated nozzle body of ductile metal; and a longitudinal passage extending through said body, said passage having an inlet, a non-circular outlet and a tapered intermediate portion, said outlet being of smaller cross-sectional area than said intermediate portion.

4. A unitary blowpipe nozzle, formed from a single piece of ductile metal by a pressure-forming procedure, which nozzle comprises an elongated nozzle body of ductile metal; and a longitudinal passage extending through said body, said passage having an inlet, a non-circular outlet and a tapered intermediate portion, said inlet and said outlet being respectively of smaller cross-sectional area than said intermediate portion.

5. A unitary blowpipe nozzle, formed by a swaging procedure, and consisting of a single piece of ductile metal having a cutting oxygen passage formed therein by a swaging operation and provided with an inlet, a tapered intermediate portion and a restricted non-circular discharge orifice, said intermediate portion having walls converging in the direction toward said discharge orifice, said orifice having a cross-sectional area smaller than that of said intermediate portion; said nozzle also having a plurality of longitudinal preheating gas passages, each of said last-named passages having a restricted outlet.

6. A unitary blowpipe nozzle formed from a single piece of ductile metal by a swaging procedure, which comprises an elongated nozzle body; a longitudinal passage extending through said body, said passage having an inlet, an intermediate portion provided with tapered side walls, and a restricted outlet orifice non-circular in cross-section but having an axis of symmetry; said outlet orifice having a smaller cross-sectional area than the said intermediate portion.

7. A unitary blowpipe nozzle formed from a single tubular piece of ductile metal having at least one longitudinal passage therethrough, by the application of pressure while said passage has therein a tapered mandrel of non-circular cross-section, said nozzle comprising an elongated nozzle body of ductile metal; and a longitudinal passage extending through said body, said passage having an inlet, a non-circular outlet and a tapered intermediate portion, said outlet being of smaller cross-sectional area than said intermediate portion.

8. A cutting nozzle consisting of a single piece of ductile metal having a tapered cutting oxygen passage provided with a restricted inlet, a tapered intermediate portion and a restricted non-circular discharge orifice, said orifice having an area smaller than that of said inlet and said intermediate portion; said nozzle also having a plurality of longitudinal preheating gas passages, each of said last-named passages having a restricted outlet.

9. A unitary blowpipe nozzle, which comprises an elongated nozzle body; a longitudinal passage within said body and having a restricted inlet, a restricted discharge orifice of non-circular cross-sectional shape having an axis of symmetry, and an intermediate chamber having tapered walls; a plurality of pressure-formed spaced longitudinal preheating gas passages within said body, and having their respective discharge orifices in groups arranged symmetrically with respect to said axis of symmetry of the non-circular orifice, each of said last-named passages having a restricted discharge orifice.

10. A unitary blowpipe nozzle, which comprises an elongated nozzle body; a longitudinal passage within said body and having a restricted inlet, a restricted discharge orifice of non-circular cross-sectional shape having an axis of symmetry, and an intermediate chamber having tapered walls free from abrupt changes in cross-section; a plurality of spaced longitudinal preheating gas passages, each of the last-named passages having a restricted inlet and a restricted discharge orifice, said last-named discharge orifices being arranged in groups symmetrically with respect to said axis of symmetry of the non-circular orifice, and respectively spaced equidistant from the longitudinal axis of said nozzle body.

11. Method of making a one-piece blowpipe nozzle having a longitudinal passage with a restricted inlet and a discharge orifice of non-circular cross-section, which comprises reshaping under pressure the longitudinal passage within a tubular blank of ductile metal to provide an inlet portion, a discharge orifice of non-circular cross-section, and an intermediate portion having smoothly tapered walls, thereafter reshaping under pressure the inlet portion of said passage to reduce the cross-section thereof to less than that of said intermediate portion of the passage, and preventing uncontrolled deformation of the walls of the blank forming the passage during the respective reshaping steps.

12. Method of making a one-piece blowpipe nozzle having a longitudinal passage with a discharge orifice of non-circular cross-section, which comprises swaging a tubular blank of ductile metal over a longitudinally flattened and tapered mandrel by means of tapered swaging dies, and maintaining all of that portion of the blank being swaged between the tapered portion of the mandrel and tapered working surfaces of the dies, thereby causing cold flow of the metal of the blank, and preventing said metal from leaving the mandrel as the mandrel and blank advance into the tapered dies.

13. Method of making a one-piece blowpipe nozzle having a longitudinal passage with a discharge orifice of non-circular cross-section, which comprises swaging a tubular blank of ductile metal over a wedge-shaped mandrel while advancing the blank and mandrel into the tapered working surfaces of swaging dies, and discontinuing the advance of the blank and mandrel during the swaging step before substantially all of that portion of the blank surrounding the tapered surface of the mandrel has passed the small diameter end of the tapered die surfaces.

14. Method of making a one-piece blowpipe nozzle having a passage with a discharge orifice of non-circular cross-section, which comprises swaging a tubular blank of ductile metal over a tapered mandrel having a flat end portion, by means of a die having a tapered working surface, and preventing the swaged metal of the blank from leaving the mandrel as the blank advances in the die.

15. Method of making a one-piece blowpipe nozzle having a passage provided with a slotted orifice, which comprises swaging a tubular metal blank of ductile metal having a longitudinal passage while said passage contains a mandrel having a tapered portion and a relatively thin flat end portion corresponding to the shape and size of the desired slotted orifice, utilizing swaging dies having tapered working surfaces, maintaining portions of the blank being swaged interposed between the tapered portion of the mandrel of the tapered working surfaces of the dies, repeating said swaging step until cold flow of the metal of the blank has caused the latter to reach the flat end portion of the mandrel, during each of such swaging steps preventing said metal from leaving the mandrel as the metal of the blank advances along the mandrel, and annealing the blank between certain of the successive swaging steps.

16. Method of making a one-piece blowpipe nozzle having a passage with a non-circular discharge orifice, which comprises introducing into an oversize longitudinal passage within a tubular blank of ductile metal a tapered mandrel having flattened portions, subjecting the blank and mandrel assembly to a series of separate and successive swaging operations employing said tapered mandrel and swaging dies having working surfaces provided with a taper at least approximately as great as the taper of the working portion of the tapered mandrel cooperating with said dies, while maintaining in frusto-conical shape during application of the swaging force thereto at least a portion of the outer surface of the blank surrounding the passage being reshaped by the swaging operation, thereby preventing the metal of the blank from moving away from the tapered mandrel, and causing the walls of said passage accurately to conform to the shape of the tapered mandrel.

17. Method of making a one-piece blowpipe nozzle having a passage provided with a slotted orifice, which comprises swaging a tubular blank of ductile metal having a longitudinal passage while the latter houses a mandrel having a tapered portion and a flat end portion, by means of tapered swaging dies, thereby causing cold flow of the metal of the blank along said mandrel, while preventing the metal from leaving the mandrel, when the leading end of the swaged blank has reached the flat end portion of the mandrel, swaging the leading end of the blank to cause it to conform accurately to the flat end portion of the mandrel, withdrawing the tapered mandrel and substituting therefor a short untapered mandrel extending through the inlet end of the blank to the tapered mid-portion of said passage previously formed, and swaging only the portion of the blank housing the last-named mandrel, thereby elongating the inlet portion of the blank and reducing the diameter of the passage at its inlet end.

18. Method of making a one-piece blowpipe nozzle having a longitudinal passage with a restricted inlet and with a discharge orifice of non-circular cross-section, which comprises swaging a tubular blank of ductile metal over a longitudinally-flattened and tapered mandrel by means of tapered swaging dies, maintaining all of that portion of the blank undergoing swaging between the tapered portion of the mandrel and tapered working surfaces of the dies, thereby causing cold flow of the metal of the blank while preventing said metal from leaving the mandrel as the mandrel and blank advance within the tapered dies, withdrawing the tapered mandrel and introducing within the inlet end of said passage an untapered mandrel of smaller cross-section than that portion of the tapered mandrel of maximum cross-section, and swaging the portion of the blank surrounding said untapered mandrel to reduce the cross-section of the inlet portion of said passage.

19. Method of making a one-piece blowpipe nozzle having a longitudinal passage with a discharge orifice of non-circular cross-section, which comprises swaging an assembly comprising a tubular blank of ductile metal and at least one mandrel including a wedge-shaped mandrel, by means of dies having tapered working surfaces; and during said swaging maintaining said mandrel-blank assembly in working contact with the tapered working surfaces of the dies, thereby continuously swaging the blank against said mandrel and preventing the metal from leaving the mandrel as the assembly advances within the dies.

20. Method of making a one-piece blowpipe nozzle having a slotted discharge orifice, which comprises forming in a tubular blank of ductile metal a longitudinal passage having a non-circular discharge orifice, forming a plurality of spaced oversize longitudinal preheating gas passages in said blank having their discharge orifices in selected location with respect to said non-circular orifice, gradually elongating and reducing the cross-section of said blank and said preheating gas passages and concurrently elongating and tapering said first-named passage by subjecting said blank to a series of successive swaging operations while said first-named passage contains a mandrel having tapered portions and a flat substantially untapered end portion, and while each of said preheating gas passages contains an untapered mandrel, at least one of said swaging operations being directed upon a zone adjacent the outlet end of the blank and surrounding the flat untapered end portion of said tapered mandrel.

21. Method of making a one-piece blowpipe nozzle, which comprises subjecting a tubular blank of ductile metal having a plurality of longitudinal oversize passages extending therethrough to a succession of swaging operations while one of said passages contains a mandrel having a tapered mid-portion and a flat end portion, and while each of the other passages has therein an untapered mandrel, thereby elongating the blank and reducing its diameter, successively substituting in each of said other passages mandrels of smaller diameter after certain of such swaging operations; after the leading end of the blank has advanced beyond the tapered portion of the first-named mandrel, swaging the leading end of the blank-mandrel assembly to reduce the outlet orifices of the passages to the selected size and shape; substituting for said tapered mandrel a short untapered smaller mandrel extending within said first-named passage adjacent its inlet end, swaging the portion of the blank surrounding said last-named mandrel to reduce the cross-section of the inlet portions of each of said passages to less than those of the mid-portions of said passages, and annealing said blank prior to each substitution of smaller mandrels.

22. Method of making a one-piece blowpipe nozzle having a slotted dscharge orifice, which comprises inserting within a longitudinal passage in a tubular blank of ductile metal a mandrel having at least two opposed flattened gradually tapered working surfaces, swaging the discharge end of the blank to form a non-circular discharge orifice, forming in said blank a plurality of spaced oversize longitudinal passages having their discharge orifices in selected location with respect to said non-circular orifice, inserting mandrels in said oversize passages and a tapered mandrel in said first-named passage, swaging the resultant assembly, using swaging dies with working surfaces having a slight taper at least approximately as great as the adjacent working surface of the tapered mandrel while restricting the swaging action to that produced by the tapered working surfaces of the dies, whereby the swaged portions of each of said plurality of passages are reduced in diameter, and the walls defining the first-named passage accurately conform throughout to the shape and size of the tapered working surface of the mandrel.

23. Method of making a one-piece blowpipe nozzle having a passage provided with a slotted orifice, which comprises swaging a tubular blank of ductile metal having a plurality of longitudinal passages therethrough while one of said passages contains a mandrel having a tapered flattened portion and a relatively thin flat end portion, and the others of said passages contain untapered mandrels, preventing said metal from leaving the mandrel as said metal flows along the tapered surface of the mandrel, thereafter subjecting said blank to a succession of separate swaging operations while said first-named passage contains said tapered mandrel, successively substituting in said plurality of passages sets of mandrels of smaller diameter after certain of said swaging operations, finally substituting in said first-named passage a short untapered mandrel for said tapered mandrel, and annealing said blank prior to each substitution of a set of said smaller mandrels.

24. Method of making a one-piece blowpipe nozzle having a slotted discharge orifice, which comprises inserting within a longitudinal passage in a tubular blank of ductile metal a mandrel having at least two opposed flattened gradually tapered working surfaces, swaging the discharge end of the blank to form a non-circular discharge orifice, forming in said blank a plurality of spaced oversize longitudinal passages having their discharge orifices in selected location with respect to said non-circular orifice, gradually elongating and reducing the cross-section of said blank and said preheating gas passages, and concurrently elongating and tapering said first-named passage, by subjecting said blank to a series of separate and successive swaging operations while said first-named passage contains a mandrel having at least two opposed flattened gradually tapered portions and a flat substantially untapered end portion and while each of said preheating gas passages contains an untapered mandrel, successively substituting in the preheating gas passages sets of mandrels of smaller diameter after certain of said separate swaging operations, annealing said blank prior to each substitution of a set of smaller mandrels and, after the swaged blank has reached a preselected length at least as long as the tapered working portion of the tapered mandrel, withdrawing the latter and substituting a short untapered mandrel extending from the inlet end of the first-named passage at least to the tapered portion thereof, gradually elongating and reducing the cross-section of the portion of said blank surrounding said short untapered mandrel and preheating gas passage mandrels by a series of swaging operations, successively substituting in each passage mandrels of smaller diameter after certain of the last-named swaging operations, and annealing said blank prior to each substitution of a set of smaller mandrels.

25. In a method of making a one-piece blowpipe nozzle having a passage with a discharge orifice of non-circular cross-section, and having a plurality of longitudinal preheating gas passages with their respective outlets located in selected relation to said discharge orifice, in which method a blank of ductile metal has formed therein a plurality of oversize gas passages, and the resultant blank is subjected to a succession of swaging operations with a tapered mandrel in a central passage and with untapered mandrels in each of the other of said passages, using successively smaller untapered mandrels in said other passages during successive swaging operations, the step of locating the outlet of each of said other gas passages, as formed, in selected position with respect to said discharge orifice to neutralize the effect of lateral curvilinear drift of the metal of the blank during said swaging operations.

26. In a method of making a one-piece blowpipe nozzle having a longitudinal passage with a discharge orifice of non-circular cross-section and having a plurality of longitudinal preheating gas passages with outlets in selected position with respect to said discharge orifice, in which method a blank of ductile metal has a plurality of longitudinal passages formed therein, and the blank is subjected to a succession of swaging operations employing rotating swaging hammers, with a tapered mandrel in a central passage and with untapered mandrels in each of the other of said passages, using successively smaller untapered mandrels in said other passages during successive swaging operations, whereby lateral twist of the metal of the blank occurs during the swaging operation, the step of reversing the direction of rotation of the swaging hammers between certain swaging steps, thereby neutralizing the lateral twist of the metal in one direction during one swaging step by the lateral twist thereof in the opposite direction in a subsequent swaging step.

27. In a method of making a one-piece blowpipe nozzle having a longitudinal passage with a discharge orifice of non-circular cross-section, and having a plurality of longitudinal preheating gas passages with their respective outlets unsymmetrically arranged with respect to said first-named orifice, in which process a blank of ductile metal has formed therein a plurality of oversize gas passages, and the resultant blank is subjected to a succession of swaging operations employing rotary swaging hammers with a mandrel in each of said passages, whereby lateral drift of the metal of the blank occurs during the swaging operation, the step of reversing the direction of rotation of the swaging hammers during certain swaging steps, thereby neutralizing the lateral drift of the metal in one direction during one swaging step by the lateral drift thereof in the opposite direction in a subsequent swaging step.

WILLIAM E. SELF.
LIVINGSTON T. DICKASON.